Feb. 21, 1961     O. C. MATTHEWS ET AL     2,972,463
ADJUSTABLE PALLET
Filed Feb. 21, 1958     2 Sheets-Sheet 1
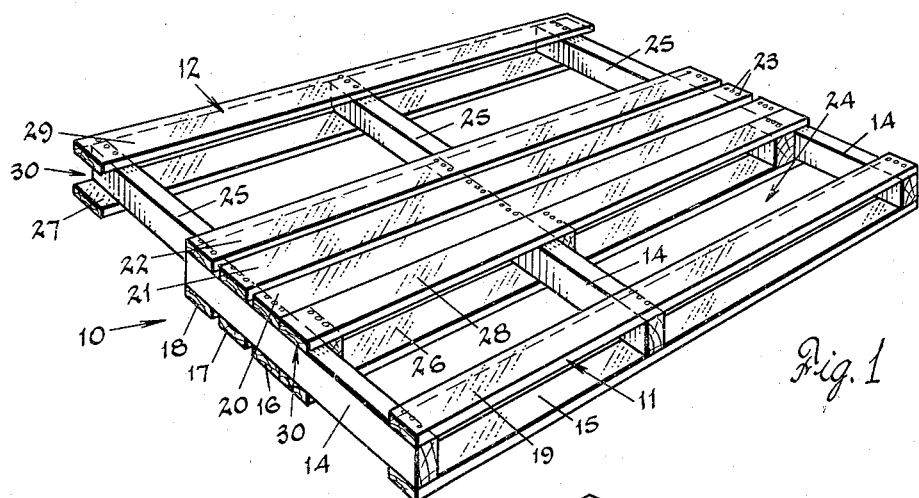
Fig. 1
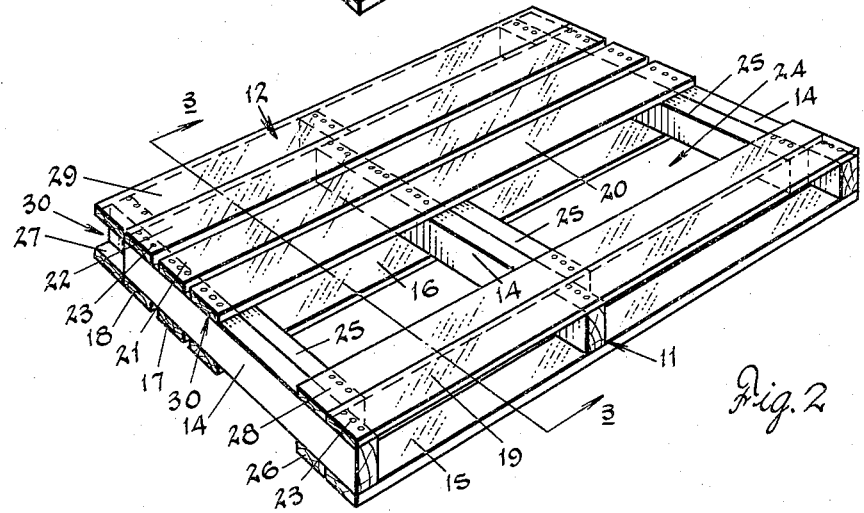
Fig. 2
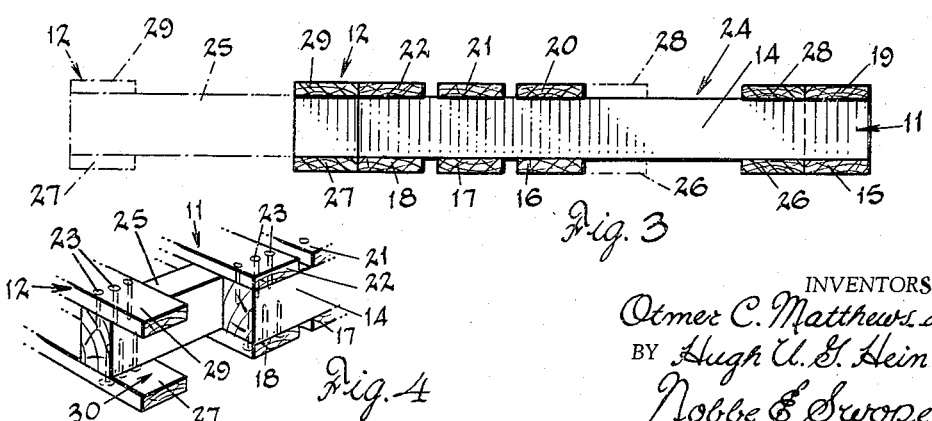
Fig. 3
Fig. 4
INVENTORS
Otmer C. Matthews and
BY Hugh U. G. Hein
Nobbe & Swope
ATTORNEYS Feb. 21, 1961 O. C. MATTHEWS ET AL 2,972,463
ADJUSTABLE PALLET
Filed Feb. 21, 1958 2 Sheets-Sheet 2
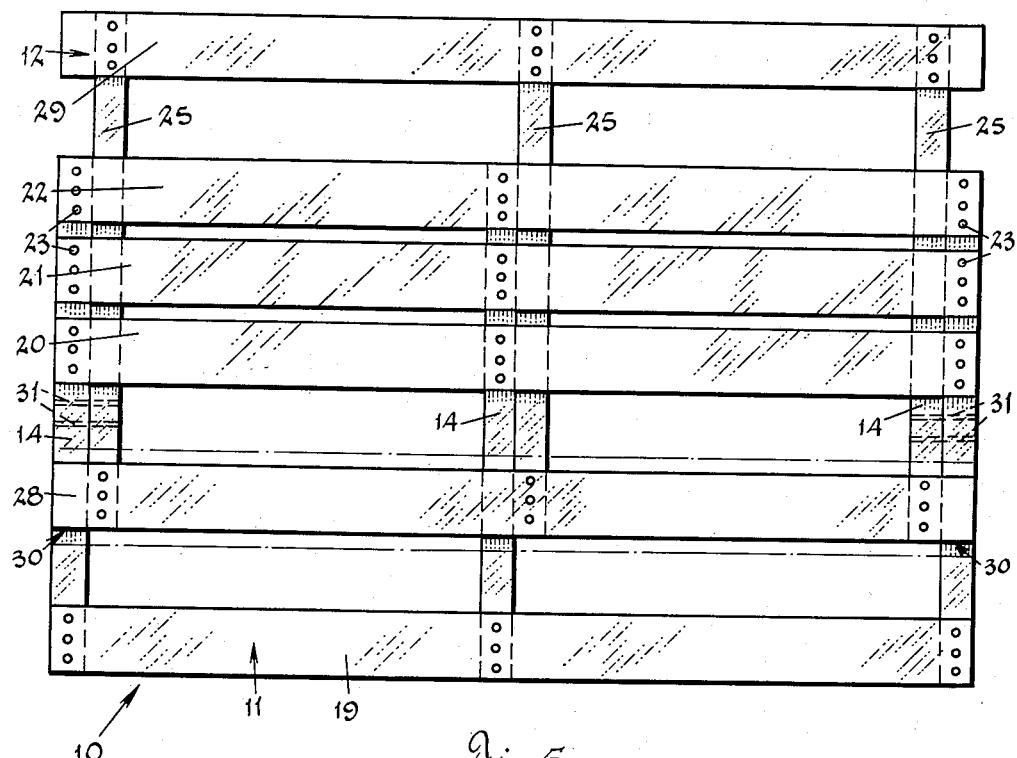
Fig. 5
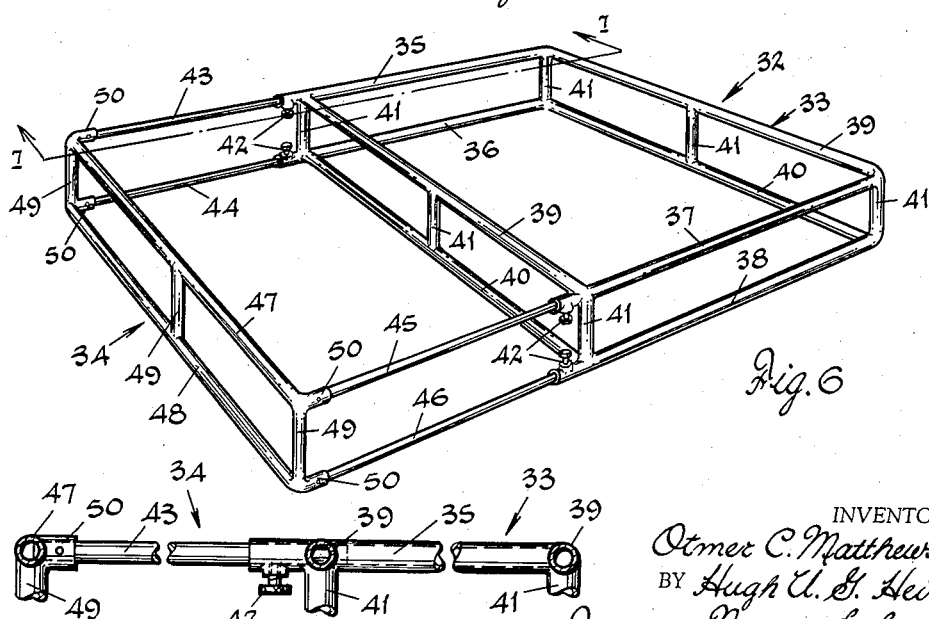
Fig. 6
Fig. 7
INVENTORS
Otmer C. Matthews and
BY Hugh U. G. Hein
Nobbe & Swope
ATTORNEYS United States Patent Office 2,972,463
Patented Feb. 21, 1961

2,972,463

ADJUSTABLE PALLET

Otmer C. Matthews and Hugh U. G. Hein, Charleston, W. Va., assignors to Libbey-Owens-Ford Glass Company, Toledo, Ohio, a corporation of Ohio Filed Feb. 21, 1958, Ser. No. 716,793

2 Claims. (Cl. 248—120)

This invention relates broadly to a supporting or working platform and is more particularly directed to an improved adjustable expansion pallet or skid wherein at least one linear dimension of the pallet may be selectively altered.

The use of flat, substantially horizontal, pallets has found wide acceptance in supporting, stacking, warehousing and transporting of both loose or packaged articles. One extensive use of these pallets or skids is in connection with a continually operating production line wherein after the last production operation, the produced articles are piled on the skids. These articles may be themselves deposited on the skid surface, one upon another, in a stack or may be deposited in a carton and the cartons themselves then placed upon the skid.

After the prescribed quantity of the material has been so transferred to the pallet or skid, a fork-lift truck will then lift the skid by inserting its prongs underneath the upper supporting surface of the skid. The skid is then transported to a suitable storage area and by constantly removing loaded skids and replacing them with empty skids, an uninterrupted flow of production is assured. Also, the finished products may be centrally located in a storage area away from the production line, thereby eliminating congestion which would otherwise exist.

In present production units it is possible to manufacture, on the same line, a variety of sizes and heretofore it has been conventional practice to provide a variety of different sizes of pallets or skids. By using the adjustable expanding pallet of the instant application, it is possible, however, to eliminate the necessity to stockpile a supply of varying sized pallets for different sized packages and/or materials. This in turn provides a substantial saving through conservation of pallet storage space and also eliminates the necessity for special equipment to handle different sized or oversized pallets.

Another important advantage is that when shipment of the goods to the manufacturer is made, it is often done by a direct shipment of the articles while they rest upon the pallet. By the use of an adjustable pallet, improper balancing of the articles on the pallet is avoided since by expanding or closing the pallet, it can be adjusted to follow substantially the same outline as the base outline of its supported packages or material.

It is therefore an object of this invention to provide an adjustable expansion pallet wherein the surface area of the pallet used to support articles is selectively adjustable.

It is still a further object of this invention to provide means for locking the pallet in any selected extended or retracted position.

It is yet another object of the present invention to provide an adjustable expansion pallet of comparably simple design which is inexpensive to manufacture, inexpensive to maintain and efficient in operation.

Other objects and advantages of the invention will become more apparent during the course of the following description when taken in connection with the accompanying drawings.

In the drawings, wherein like numerals are employed to designate like parts throughout the same:

Fig. 1 is a perspective view showing a pallet constructed in accordance with the invention in an extended position;

Fig. 2 is a perspective view of the same pallet in closed position;

Fig. 3 is a sectional view taken along the lines 3—3 of Fig. 2;

Fig. 4 is an enlarged, fragmentary, perspective view showing the relationship of the movable parts of the pallet;

Fig. 5 is a top plan view of the extended pallet;

Fig. 6 is a perspective view of a modified form of the invention; and

Fig. 7 is a sectional view taken along the lines 7—7 of Fig. 6.

In the accompanying drawings, and in Figs. 1 and 2 particularly, there is shown a substantially rectangular pallet or skid desginated in its entirety by the numeral 10. This pallet 10 is composed of two independent sections desginated generally as a first section at 11 and a second section at 12. The second section 12 is slidably received within the first section 11 so as to make the over all length of the pallet support surface adjustable by an expansion or retraction of the second section 12 relative to the first section 11.

The first section 11 is composed of a plurality of longitudinally extending stringers or brace members 14, there being three in the specific embodiment shown, and these brace members are interconnected by a plurality of transversely extending deck boards and floor boards. In the embodiment shown there are four floor boards 15, 16, 17 and 18 and four deck boards 19, 20, 21 and 22. These floor boards and deck boards are fastened to the bottom and top respectively of the stringers 14, in parallel relationship to each other and substantially prependicularly with respect to the stringers 14, by nails or other suitable fastening devices indicated at 23, Fig. 2. They are disposed so that each floor board on the bottom surface of the skid is diametrically opposed by a companion deck board on the upper face of the skid. Referring now to Figs. 1 to 3 particularly, it is seen that between the floor board-deck board pairs 17, 21 and 18, 22, respectively, there is an opening 24 in skid section 11 for a purpose to be hereinafter described.

The second section 12 of the adjustable pallet is composed, like the first, of a plurality of stringer or brace members 25 there being three in the embodiment shown. These brace members 25 may be interconnected by two floor boards 26, 27 and two deck boards 28 and 29 by fastening means 23. All the brace members 14 and 25 are of the same general dimensions so that all floor boards are disposed in substantially the same horizontal plane as are all of the deck boards. However, as seen in Fig. 1 the outermost brace members 25 of the second section 12 are inwardly disposed with respect to the outermost brace members 14 of the first section 11 and the adjacent surfaces of each are in bearing engagement. Therefore, as seen in Fig. 4, when an outer brace member 25 of the second section is fastened to the cross or transverse floor board 26, 27 and deck board 28, 29 the respective floor boards and deck boards project slightly beyond the vertical surfaces of the brace member 25. This overhang forms key slot 30 so that when the second section 12 is slid within the first section 11 the key slot portion 30 as formed between deck board 28 and floor board 26 will engage the outermost braces 14. It naturally follows that a push or pull pressure upon the second section 12 will cause section 12 as a unit to slide in and out of the first member supported in its path by braces 14 whereby the overall length of the pallet may be varied.

This is shown in Fig. 1 where second section 12 has been fully extended so that deck board 28 of the second section is flush with and bearing against deck board 20 of the first section 11. Referring to Fig. 2 the second section 12 has been fully retracted and the deck board 29 of the second section 12 is now flush with and bearing against the deck board 22 of the first section. Through the medium of the braces 25 and 14, the middle brace 25 sliding in the hollow interior formed between the deck pieces 19, 20, 21 and the floor boards 15, 16, 17 deck board 29 will remain in substantially the same horizontal plane as the deck boards 19, 20 and 21 of the first section. This is most clearly shown in Fig. 3 where the pallet is shown in full line in its closed position as hereinabove described and in dot dash outline in its extended position.

Therefore, by providing an opening 24 between a deck board 21-floor board 17 pair and a deck board 22-floor board 18 pair, the degree of adjustability of the pallet length may be suitably preselected. It is of course understood that the size of this opening to provide the length extension will normally be dependent upon the weight which is to be placed upon the skid member.

When the pallet section 12 has been extended a desired distance, any suitable securing means such as a nail, when the skid is made out of wood, may be driven through the brace members 25 and 14 where they are coextensive to provide a locking of the pallet in any intermediate position. This is shown in Fig. 5 where the nails 31 have been driven between the skid sections between the stringers 14 and 25 so as to maintain the deck board 28 in the opening 24 and in an intermediate position substantially between the deck board 20 of section 11 and the deck board 19 of section 12. This provides for an intermediate length of pallet and it naturally follows that any number of positions might be achieved depending upon the size of opening 24.

Figs. 6 and 7 show a modification of the hereinabove described embodiment wherein rather than having a wooden pallet, the pallet is composed of hollow, tubular, metallic members. This pallet, generally indicated at 32, is like the embodiment hereinbefore described and is divided substantially into two telescopic sections. The first section 33 is equivalent to the first section 11 hereinabove discussed and the second section 34 is equivalent to the second section 12 hereinabove discussed.

Referring more particularly to the first section 33 there are a plurality of cylindrical rods of which rods 35, 36, 37, 38, 39, 40 are hollow. Rods 35, 36, 37 and 38 are comparable to the stringer elements of the first section and are connected to cross brace rods 39, 40 to form the outline of the first section deck, rods 35, 37, 39 forming the deck pieces and rods 36, 38 and 40 forming the floor pieces. Proper spacing to maintain the rods in a substantially parallel horizontal plane is secured by a series of vertical support members 41. All the aforementioned rods may be welded to each other or otherwise suitably connected to each other by pipe joints or if desired, they might all be formed by bending of conventional tubular pipes. Any suitable bar or rod configuration could be substituted for that shown limited only that this first section must be adapted to slidably receive a second or slidable extension section therewithin.

The rods 35, 36, 37 and 38 extend slightly beyond the vertical plane determined by the left end rods 39, 40 to receive in their outer surface a threaded locking screw member 42. In the embodiment shown four of these members 42 are provided and serve to lock the slidable second section, to be hereinafter described, in any desired position.

Second section 34 is similar to the secction 33 being composed of a series of stringer rods 43, 44, 45 and 46 which are interconnected by cross bars 47 and 48, rods 43, 45, 47 forming the deck portion and rods 44, 46 and 48 forming the floor section. Again, in the second section 34, as was true in the first section 33, the spacing between floor portion and deck portion is maintained by the verticle bars 49. In this embodiment the outside diameter of the rods 43, 44, 45 and 46 is somewhat less than the diameter of the hollow interior of the rods 35, 36, 37, 38 so that the former may be slidably receivable within the latter. Since the rods 43, 44, 45 and 46 are of a smaller diameter than the rods 35, 36, 37 and 38, they are preferably independent rod members which are received into pipe joints 50, secured in fixed relationship to the rods 47, 48, or otherwise suitably fastened thereto.

It is therefore seen that a pull or pushing motion on section 34, will cause that section to be expanded or retracted with respect to the first section through the medium of the slidable rods 43, 44, 45, 46 which enter into and slide through the hollow interior of rods 35, 36, 37, 38. When the desired position of the second section has been achieved so that the proper lineal distance between the rods 39 and 47 has been secured, locking screws 42 are screwed inwardly so that their inwardly projecting end forms a tight frictional bite against the rods 43, 44, 45, 46. In this manner the second section is fixed relative to the first section.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. An adjustable support platform having a first frame section and a second frame section, said first frame section comprising a plurality of longitudinally disposed brace members of substantially equal length and disposed in spaced parallel relation to one another, a plurality of pairs of transversely disposed cross-bars interconnecting the brace members in fixed relation and secured to the upper and lower surfaces thereof, one pair of the transversely disposed cross-bars being located at the respective ends of the said brace members and the other pairs of said cross-bars being arranged to provide an open space between one of the endmost pair of cross-bars and an adjacent pair of cross-bars spaced from said endmost pair of cross-bars, said second frame section comprising a plurality of longitudinally disposed brace members arranged substantially parallel with and inwardly of the brace members of said first frame section and slidably received between the plurality of pairs of cross-bars of said first frame section, a pair of transversely disposed cross-bars secured to the respective ends of the second-mentioned brace members on the upper and lower surfaces thereof, the pair of cross-bars at one end of the second frame section being located outwardly of the pair of cross-bars at the respective end of the first frame section, while the pair of cross-bars at the opposite end of the second frame section are located inwardly of the pair of cross-bars at the respective opposite end of the first frame section and positioned in the said open space formed by the pairs of cross-bars of the first frame section and adapted to contact one or the other of the said pairs of cross-bars to define the limits of sliding movement between the said first and second frame sections when the second frame section is moved relative to the first frame section in a direction parallel to the brace members of said sections.

2. An adjustable support platform as defined in claim 1, wherein the opposite ends of the pair of cross-bars of the second frame section located within the open space defined by the pairs of cross-bars of said first frame section overlap the brace members of the first frame section to maintain the brace members of the second frame section in sliding relation therewith.

References Cited in the file of this patent

UNITED STATES PATENTS

| | | |
|---|---|---|
| 1,155,105 | Schreiner | Sept. 28, 1915 |
| 2,377,911 | Warren | June 12, 1945 |
| 2,764,377 | Schoenecker | Sept. 25, 1956 |